United States Patent [19]

Hajnal

[11] 4,375,913
[45] Mar. 8, 1983

[54] SNORKEL SYSTEM

[76] Inventor: Stephen Hajnal, 5600 Riverdale Ave., Bronx, N.Y. 10471

[21] Appl. No.: 314,590

[22] Filed: Oct. 26, 1981

[51] Int. Cl.³ .......................................... G03B 17/48
[52] U.S. Cl. ...................................... 354/79; 352/94; 350/502; 350/540
[58] Field of Search ................... 354/79; 350/19, 48, 350/54; 358/225; 352/94

[56] References Cited

U.S. PATENT DOCUMENTS

| 4,195,922 | 4/1980 | Hajnal | 354/79 |
| 4,226,518 | 10/1980 | Kellner | 354/79 |
| 4,235,541 | 11/1980 | Jamel | 354/79 |

FOREIGN PATENT DOCUMENTS 1286355 8/1972 United Kingdom .................. 354/79

Primary Examiner—John Gonzales
Attorney, Agent, or Firm—Jacobs & Jacobs

[57] ABSTRACT

A snorkel camera system using an 8 mm format camera lens as the prime lens and a 35 mm camera body employing 35 mm film.

7 Claims, 1 Drawing Figure

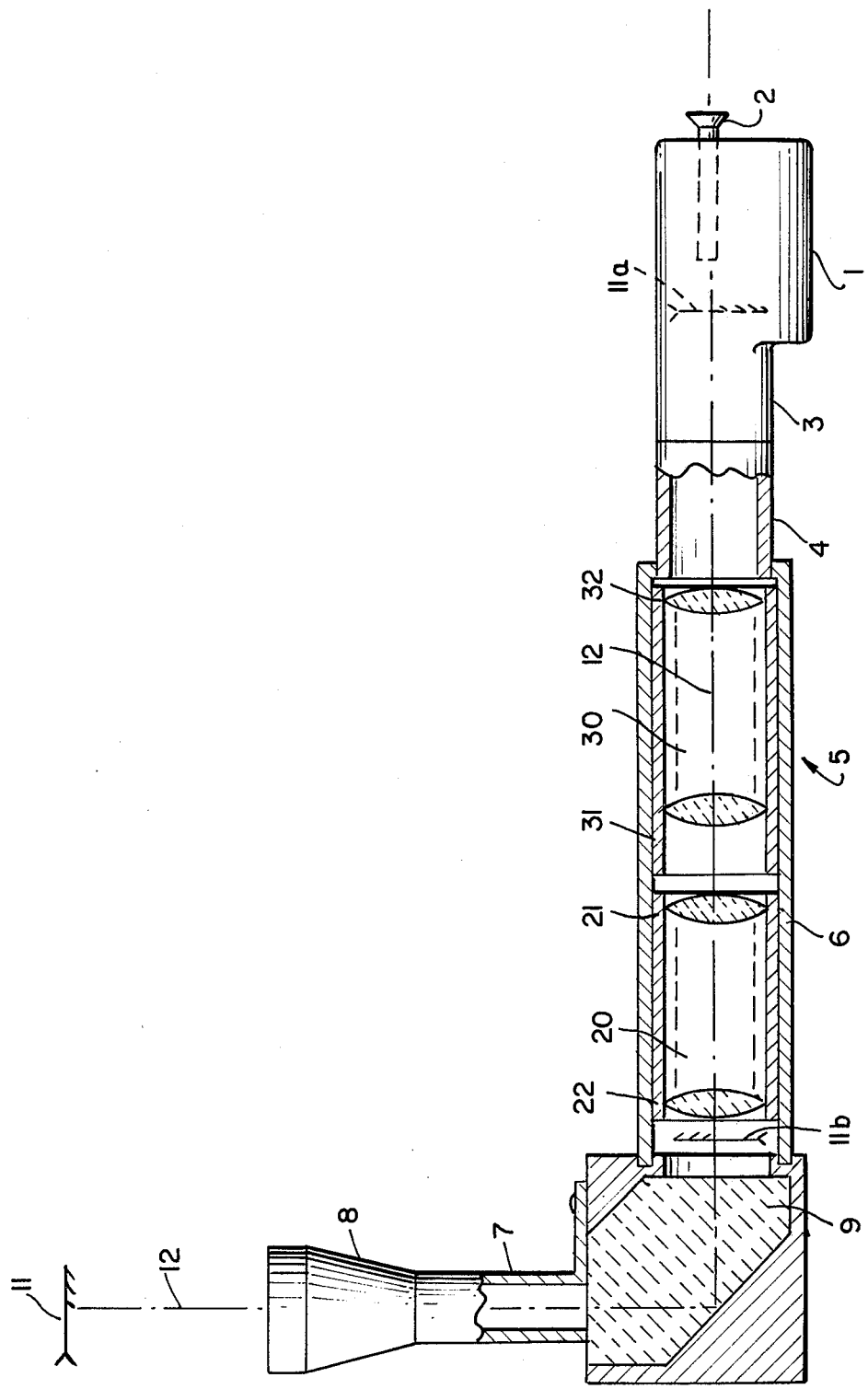

SNORKEL SYSTEM

The present invention relates to a snorkel camera system.

The present invention is an improvement in the snorkel camera system of my U.S. Pat. No. 4,195,922 issued Apr. 1, 1980. In that patent, the snorkel camera system employed a relay lens means to transmit the image through the housing of the snorkel camera system. In the present invention, two lenses of specified design are employed instead of a simple relay lens so that a super 8 mm format camera lens can be used as the prime lens in combination with a 35 mm format or videotape camera body. This enables the system to obtain an extremely high resolution with an exceptionally increased depth of field.

The present invention is illustrated in terms of a preferred embodiment in the accompanying drawing, in which the sole FIGURE is a diagrammatic view, partly in section, of the camera snorkel system of the invention.

The drawing shows the snorkel system of the invention, comprising a camera body 1, having an eyepiece 2 and a lens mount 3, connected to a mounting ring 4, of a snorkel assembly 5. Camera body 1 has the usual film advancing mechanism (not shown) and is a fully operational camera minus the camera lens itself. Camera body 1 is a 35 mm format motion picture or still camera, or a videotape camera.

The snorkel assembly 5 includes a tubular housing 6 having a lens mount 7 at its lowermost end to which is connected an 8 mm format camera lens 8 of desired optical characteristics. Adjacent lens mount 7 is an Amici roof prism 9, and compound lenses 20 and 30 are located between prism 9 and mounting ring 4. Compound lenses 20 and 30 are shown diagrammatically with only the front and rear elements drawn in solid line.

The operation of the snorkel system of the invention is as follows. The object 11 to be photograhed is viewed through the lens of eyepiece 2 and the optical path 12 of the snorkel system is through lens 8, roof prism 9, and lenses 20 and 30 to the eyepiece 2 of camera body 1. Camera body 1 is provided with conventional beam splitter means (not shown) to transmit the image of object 11 onto a film (not shown) and a viewing screen (not shown), as is common for single lens reflex cameras. The image transmitted to the film plane is image 11a, i.e. an upside down and reversed image. Eyepiece 2 transmits the image 11a seen on the viewing screen to the eye, and the eye "sees" an image identical to object 11, not its mirror image. This is accomplished as follows.

The image of object 11 emerges from camera lens 8 upside down and reversed. Roof prism 9 erects and reverses this image to provide an image 11b identical to the object, i.e. erect and non-reversed. Image 11b is transmitted via lenses 20 and 30 to a viewing screen (not shown) upon which image 11a is focused. Image 11a is upside down and reversed, and the lens in eyepiece 2 erects and reverses image 11a so that the eye "sees" an erect, non-reversed image identical to object 11. Since snorkel systems are often used in tight quarters, it is necessary to avoid viewing mirror images that can be confusing.

Lenses 20 and 30 are employed to enlarge the image obtained from the 8 mm format lens 8 to accommodate the larger image size of the larger format camera body 1, while meeting the requirement that the image seen by the eye through eyepiece 2 is erect and non-reversed. This is accomplished by employing a 58 mm focal length, 35 mm format lens 20 with the front 21 facing eyepiece 2 and the rear 22 facing prism 9, and a 200 mm focal length, 35 mm format lens 30 with the front 31 facing prism 9 and the rear 32 facing eyepiece 2. In a preferred embodiment, lens 20 has a maximum aperture of f1.4 and lens 30 has a maximum aperture of f4. Lenses 20, 30 can be disposed in a light path with either end being upstream, but one of the two positions will provide a greater magnification, $m=p/q$, where m is the magnification and p and q are the object and image distances, respectively. As used herein, the "front" and "rear" of lenses 20, 30 refers to the upstream and downstream ends, respectively, when the lens 20, 30 is in the position that provides the greater magnification. Thus, in the Figure, lens 30 is disposed in the light path in its "normal" position to provide a greater magnification, while lens 20 is "reversed" and will provide a lesser magnification than if disposed in its normal position.

Quite surprisingly, the lens system 8, 20, 30 provides the 35 mm format or videotape camera body 1 with a high resolution image that is characteristic of the 8 mm format lens 8, and with the image enlarged to the 35 mm (or ¾ inch or 1 inch videotape) format size, but this is accomplished at a depth of field that is far beyond that which could have been predicted. Thus, when lens 8 is a super 8 mm format, 6 mm to 80 mm zoom lens, f4 to f22, a depth of field of one inch to infinity is obtained using a 35 mm format camera body mount. While some light is lost through prism 9 and lenses 20 and 30 of about two stops, this loss is insignificant as compared to the increase in resolution and the phenomenal increase in depth of field.

An important advantage of the present invention is the ability to interchange shooting lenses. With the prism 9 being internal of the system, the need for an external mirror is eliminated. In consequence thereof, the camera lens 8 may be easily replaced by another lens simply by detaching it from lens mount 7. Either screw-in or bayonet mounting may be employed for lens mount 7, as desired.

Camera body 1 will generally be a motion picture film camera, but may also be a television camera or videotape camera. The snorkel system 5 is readily attached to the lens mount of a television or videotape camera, which is then employed in the normal manner. Alternatively, the television or videotape camera (not shown) can be attached directly to the eyepiece 2 of the camera body 1 (which can be loaded or not). It will be appreciated that lenses 20, 30 will be moved in the housing 6 to the proper focus position depending upon whether camera body 1 is a 35 mm format camera or a videotape camera.

What is claimed:

1. A snorkel camera system comprising a 35 mm format or videotape camera body means having a camera housing with a light admitting opening therein, means for recording images transmitted through said light admitting opening, and an eyepiece having a lens therein for viewing the object being photographed; an elongated hollow housing means having one end arranged for light entry and the other end for light egress, the light-egress end of said housing means being detachably secured to said camera body means at said light admitting opening; an 8 mm format camera lens means detachably secured to the light-entry end of said housing means; and optical means for providing an optical path from said 8 mm format camera lens means through said hollow housing means to and through the light admitting opening of said camera body means; said optical means comprising a prism means in said housing means adjacent said light entry end and having a first face disposed toward said camera lens means and a second face perpendicular to said first face and disposed toward said camera body means, first and second 35 mm format lenses in said housing means between said prism means and said light egress end, said first and second lenses having their front ends facing one another, said first lens having a focal length of 58 mm and being adjacent said prism means and said second lens having a focal length of 200 mm and being between said first lens and said light egress end, said prism means being operable to erect and reverse the image transmitted by said 8 mm format camera lens means through said first face and to transmit said erected non-reversed image to said first and second lenses through said second face, whereby an erect non-reversed image of the object is viewed through said eyepiece.

2. The system according to claim 1, wherein said camera body means is a motion picture camera body.

3. The system according to claim 1, wherein said camera body is a television camera or a videotape camera body.

4. The system according to claim 1, wherein said prism means is an Amici roof prism.

5. The system according to claim 1, wherein said prism means is a roof prism means.

6. The system according to claim 6, including cooperating means on said housing means and said camera body means for detachably securing said camera body means to said housing means.

7. The system according to claim 1, wherein said 8 mm format camera lens is a 6 mm to 80 mm focal length zoom lens.

* * * * *